Figure 1:
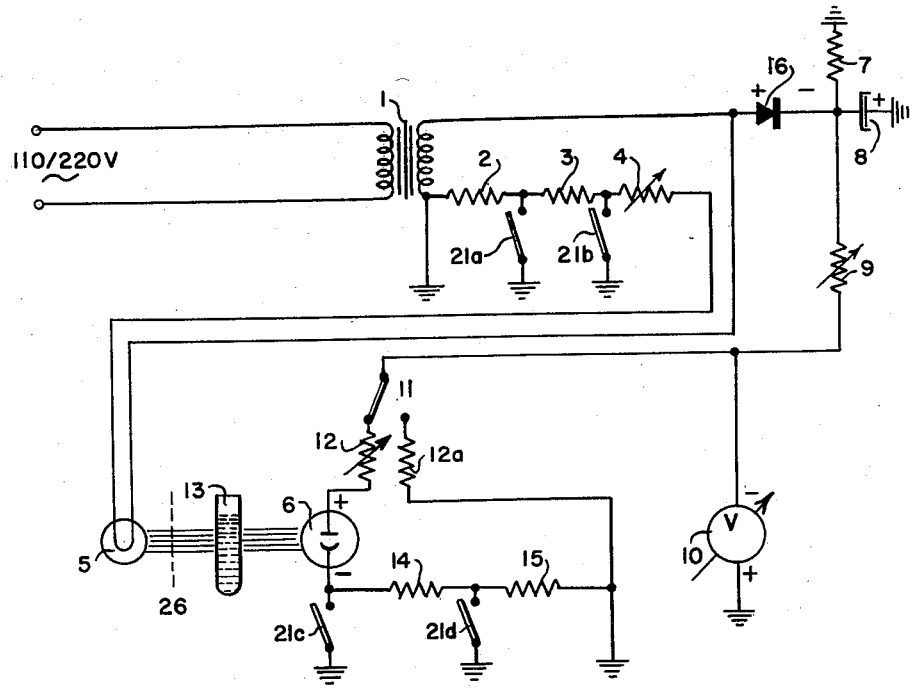

INVENTORS
HANS FUHRMANN &
KARL SCHWABE
BY Michael S. Striker
ATTORNEY

United States Patent Office 2,891,438
Patented June 23, 1959

2,891,438

PHOTOELECTRIC PHOTOMETER HAVING COMPENSATING MEANS FOR LINE VOLTAGE FLUCTUATIONS

Hans Fuhrmann, Hamburg-Altona, and Karl Schwabe, Weisskirchen, Germany; said Fuhrmann assignor to S. L. F. Engineering Company, Hamburg, Germany, a partnership Application March 21, 1951, Serial No. 216,816

Claims priority, application Germany March 23, 1950

7 Claims. (Cl. 88—14)

The present invention relates to photoelectric photometry and more particularly to improvements in electric circuits for photometric devices providing novel compensating means for brightness fluctuations of electric light sources in photometry, occurring due to power-supply voltage variations. Furthermore, this invention provides a novel test method applying said improved photometric devices.

Conventional photoelectric photometers and especially colorimeters, provided with an electric light source, impose the problem of compensating for inherent power-supply voltage variations during photometric measurements in order to obtain a constant light intensity and reliable results. Present solutions of this problem are rather complicated, require additional photoelectric cells and other circuit elements, and, nevertheless, are not entirely satisfying.

The primary characteristic of the present invention is a simple compensating circuit which prevents harmful results of brightness fluctuations of electric light sources in photoelectric photometry very effectively. Said circuit provides that a voltage is taken off from the same power-supply voltage on which the light source operates, and is suitably introduced, rectified if necessary, in opposite direction into the measuring circuit of the photocell in such a manner that it compensates for errors inflicted by light-intensity fluctuations and so corrects the instrument readings. The application of a circuit arrangement according to this invention enhances the accuracy and constancy of common photoelectric measuring methods considerably.

Another characteristic of this invention resides in the fact that with correct working voltage at the terminals of the light source, the opposing voltage introduced into the photocell measuring circuit is adjusted so that no current passes through the indicating instrument, which consequently shows null, when no absorbing medium is put into the path of the light, and that, on the other hand, said instrument shows full deflection when the photocell is darkened, i.e., completely protected from light.

A feature of the invention is furthermore that more than one dial is provided for the indicating instrument and that these dials are readily exchangeable, whereby each one of the dials is calibrated and graduated as required for a specific test and gives in each case direct readings of the results in percent, milligrams, or other units as engraved on the dial used and as desired.

Another feature of this invention lies in interlocking and resistance electing means which actuate contact fingers automatically at the same time a new dial is put upon the instrument, whereby the selecting means secured to each dial are in accordance with its graduation, i.e., they are so designed that they actuate contact fingers and thereby adjust the constants of the electric circuits by inserting or removing resistance values so that the deflection of the pointer on the dial effected by the photocell potential is a true indication of the results.

Figure 2:
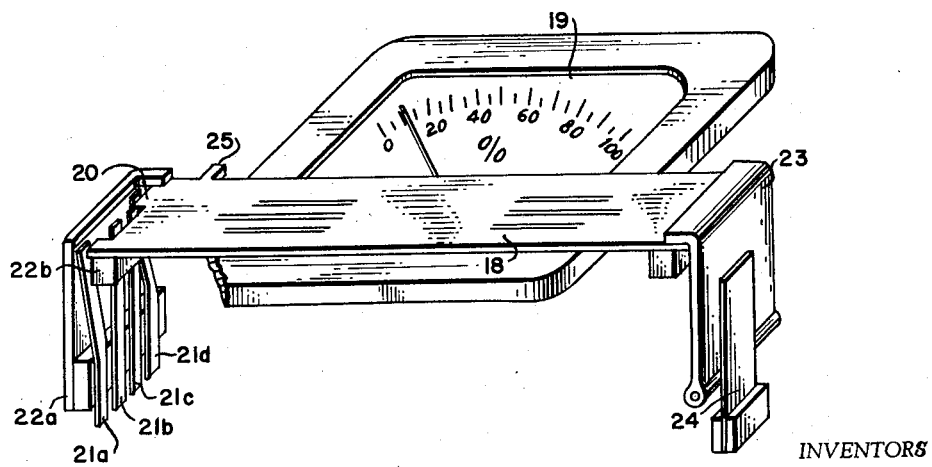

Further characteristics, features, and advantages of this invention will become apparent from the following detailed description, taken in connection with the accompanying drawing, wherein:

Fig. 1 is a diagram of the electric circuit of a preferred form of this invention, and Fig. 2 is a perspective view of a dial arrangement showing a preferred construction thereof with resistor selecting and contact finger actuating means.

Referring to the drawing, reference 1 (Fig. 1) represents a transformer whose primary winding is connected to suitable power source. One lead of the secondary of transformer 1 connects through the fixed resistors 2, 3 and the variable resistor 4 to an electric light source, comprising, for example, a 15 watts, 12 volts electric lamp and serving to illuminate the photocell 6. The other terminal of the lamp 5 is, by way of resistors, on ground by being connected to the chassis of the device. The other lead of the transformer secondary connects to a rectifier 16 and hence to a grounded resistor 7 which is bridged by a condenser 8. The direct current supplied by rectifier 16 passes through a variable resistor 9 and is introduced into the circuit of photocell 6, representing the measuring circuit, so that its voltage opposes the voltage self-generated by the photocell and consequently indicating instrument 10 is affected by only the difference between these two voltages. In operation it is advisable, to adjust the voltage of the rectified current to such a value that maximum deflection of the pointer on instrument 10 is obtained when the terminal voltage of the lamp and the voltage generated by the photocell are disconnected from instrument 10. Furthermore, the voltage drop across instrument 10 is advantageously so chosen that indication on instrument 10 drops to null when the normally illuminated photocell is reconnected into the circuit. To be able to compensate for voltage differences due to varying characteristics of photocells by exchange of the latter, an additional variable resistor 12 is inserted in the circuit in series with the photocell.

By matching the operating voltage of the lamp and the maximum deflection of the pointer on the instrument as above described, a simple means of control of the lamp-filament temperature and, consequently, of the spectral distribution of the light emitted is achieved. Before applying the device, it is only necessary to disconnect the photocell from the circuit and connect it to a substitute resistor 12a by simply actuating switch 11, and then to adjust the terminal voltage of the lamp so that maximum deflection of the pointer on the indicating instrument is obtained. If now a light-absorbing medium is interposed in the path of the light by filling cavity 13 therewith, a deflection of the pointer on the instrument is effected which is in direct proportion to the magnitude of absorption by the medium.

By applying the circuit of this invention, the null point on the instrument lies normal, also on the left-hand side, by full illumination of the photocell. The important feature of this invention is, however, that changes in brightness of the illuminating lamp, effected by voltage fluctuations in the supply circuit, are counteracted in their effect on instrument indications by the opposing voltage introduced into the measuring circuit as previously described. In other words, an increased voltage at the lamp terminals increases the light intensity and in turn its effect on the photocell resulting in a higher voltage generated by the latter, but when this happens, the opposing compensating voltage increases also, since it is effectively in parallel with the lamp circuit, and cancels the effect of increased photocell voltage in instrument indication. By selecting the proper working point (proper operating voltage of the lamp) it can be achieved that the compensation as just described follows all voltage fluctuations occurring in practice, and corrects them with sufficient accuracy.

Known photoelectric measuring methods usually employ for such compensation a second photocell with all its supplementary parts including electrical, optical, and mechanical elements. All such complicated and expensive equipment is eliminated by the simple means of this invention.

The procedure for measuring the factor of absorption of a certain liquid with the device of this invention now will be described. First, the photocell is disconnected from the measuring circuit including the indicating instrument by actuating switch 11. The variable resistor 9 in the instrument circuit is then set so that a full deflection of the pointer on the instrument is obtained. This deflection, pointer in its right-hand end position, is also the measuring point characterized thereby that with the pointer in this position no photocell-generated current flows, which condition can be obtained also with the photocell in circuit by completely darkening (covering) the photocell. The simple disconnecting method of the photocell practiced by this invention is a considerable advantage as it can be effected by a simple switch operation, whereas conventional photometers depend on mechanical darkening means such as shutters or the like. The switch 11 is designed as a push-button-type changeover switch and the photocell is reconnected into the instrument circuit at the instant the push-button is released. If then fully illuminated, the photocell generates just enough voltage to effect return of the instrument pointer to null.

When after the above described preliminary adjustment, a diluted solution is introduced into the path of the lamp's rays in order to determine its concentration from the absorption of light effected, a method well known in the art, the pointer of the instrument deflects in proper proportion to the absorption. Now it will be understood that for controlling the null point, it is neither necessary to remove cavity 13, which is time wasting and inconvenient, nor to introduce another test sample for comparison, but only to compress the push-button of switch 11 to make sure that the maximum deflection is still correct, since the null point maintains automatically its proper relation to the maximum-deflection point.

The adjustment control by checking the maximum-deflection point is very accurate, because the null point in connection with the circuit of this invention varies considerably less than the maximum-deflection point. This is due to an advantageous operating voltage of the lamp and to the fact that calibration is effected by correction of maximum deflection.

In order to be able to vary the sensitivity of the photometric measuring arrangement of this invention within certain limits, the brightness of the lamp can be adjusted by means of the resistors 2 and 3. For the same purpose, the photocell currents have to be also adjusted in proper relation to the brightness of the lamp and this can be done by setting the resistors 14 and 15. Change of resistance values of resistors 2 and 3 as well as of the resistors 14 and 15 can be accomplished by tap-changing by means of contact fingers 21a, 21b, 21c, 21d which are arranged on the side walls of the device and are actuated by projections on an insulating board or templet which is secured to the dial and is properly set when the latter is pushed into place. This arrangement facilitates the manipulation of the measuring device to such an extent that it can be handled even by a novice, since all voltages adjust themselves automatically in conformity with the calibrated dial which is to be used for a certain test and is pushed into place for that purpose.

A preferred embodiment of a resistance selecting device and a dial is illustrated in Fig. 2. The transparent dial 19, consisting of celluloid or the like, is secured to an insulating board or templet 18, and is calibrated directly in percent., milligrams, or other measuring units, just as the case may require. The templet 18 of insulating material is provided with projections 20 which engage and actuate the contact fingers 21a, 21b, 21c, 21d when templet 18 is slid into place between the guides 22a and 22b which are shown partly broken away on the left-hand side of Fig. 2. It depends on the number of projections 20 on a templet how many contact fingers 21 are actuated, i.e., moved to make contact with the chassis. Thus resistance values of the resistors 2 and 3 as well as 14 and 15 (Fig. 1) are shorted out of the circuits. Templet 18 is being urged against the contact fingers 21 by a hinged wall portion 23 on the opposite side of the housing. Wall portion 23 in turn is urged inwardly by blade spring 24, and so dial and templet are held securely in place.

The device above described, if suitably calibrated, represents a convenient means for determining quickly and accurately the absorption values and all other factors, such as density, concentration, etc., which are functions of light absorption, of any medium. The procedure of determining the sugar content of a solution will now, for example, be described.

Up to now, traces of sugar in a solution have been detected by admixing in a test-tube to a sugar solution, having, for instance, a sugar content in the range of 0.005 to 1%, a few drops of alphanaphthol solution (about 20% dissolved in alcohol) and then carefully adding concentrated sulphuric acid. If traces of sugar are present in the solution, a violet ring appears at the parting line between the water and the sulphuric acid. This method, however, gives only qualitative results without any indication of the prevailing sugar concentration.

By methods made possible by means of this invention, known indicators, such as alphanaphthol, thymol, resorcin, bethanaphtol, morphin, codein, phenacetin, or the like; the required addition of acid; and the solution to be tested are compounded in definite proportion and vigorously mixed until a homogenous coloring appears which allows photometric tests giving quantitative results.

For successful testing it is thereby of primary importance that besides accurate proportioning, the solution has to be intimately mixed, which is contrary to previous methods requiring liquid layers. Only intimate mixing lends the solution a homogenous coloring, suitable for photometric tests. Such solution is then inserted into the light path between lamp and photocell representing a darkening means corresponding properly to the coloring of the solution. The sensitivity of this method is surprising and traces of 0.001% sugar content can be detected.

Darkening, i.e., violet coloring, increases up to 1% sugar content rapidly, so that with 1% content practically no light penetrates the solution.

The method is suitable for all sugar solutions, if sufficiently diluted for the test. Proper dilution in the range of 0.01 to 0.1% is necessary to come in the sensitive portion of dial graduation of the photometer. In this manner it is possible to test also urine and blood-sugar contents fast and accurately. It is only necessary to dilute the test samples properly.

A special advantage of our method becomes apparent in urine testing, whereby the urine needs not be cleared but only sufficiently diluted. The most suitable dilution lies in the range from 1:5 to 1:100. For blood tests, the blood is discolored by known methods and then also correspondingly diluted. Above examples give an illustration of the diversified applicability of our invention.

In considering further the mechanical features of the present invention, it may be mentioned here that by applying suitable templets for each specified test, wherefore a dial calibrated for such test is placed upon the instrument, and whereby automatically therewith the constants of the circuits, i. e., the operating, opposing, and photocell voltages, are correspondingly adjusted, the whole procedure is so simplified that even a novice is able to select the most favorable test conditions by simply putting the right dial on the device. No calibration curves and conversion whatsoever are required. To prevent errors, each dial may carry a label showing for what test it is to be used. It may be mentioned here that a test for the determination of sugar in blood, which hitherto took about two hours, can be completed within three to five minutes by means of this invention.

Besides actuating the contact fingers for change of resistance values, the dial templets may be provided with additional projections, notches or the like and so be made suitable to actuate other auxiliary means required in photometric testing.

It is for instance possible to actuate suitable mechanism 25 which raise different color filters 26 into the passage-way of light between lamp and test sample. Filters of suitable color shades may be thus automatically brought in active position, when required for a certain test, at the same time the corresponding dial is put upon the device.

Having thus described our invention, we are aware that various changes may be made in certain details of the present construction and in arrangement of elements in the circuit, and we therefore do not intend to be limited except as defined by the scope and spirit of the appended claims.

What we claim is:

1. An arrangement for testing of translucent substances, comprising, in combination, a light source; a photoelectric cell arranged in the path of the light rays emitted by said light source; receiving means arranged in the path of light rays between said photoelectric cell and said light source for receiving a substance the light absorption properties of which are to be determined; A.C. voltage source means connected to said light source for energizing the same; rectifier circuit means connected across said A.C. voltage source means; first circuit means connected across said rectifier circuit means and capable of deriving therefrom an electric compensating voltage which is proportional to the A.C. voltage supplied to said light source for supplying said compensating voltage across said photoelectric cell in such a manner that the voltage generated by said photoelectric cell is of opposite polarity relative to said compensating voltage; electric indicating means for indicating the absorption of light in the substance received by said receiving means; and second circuit means electrically connecting in parallel said photoelectric cell and said indicating means.

2. An arrangement for testing of translucent substances, comprising, in combination, a light source; a photoelectric cell arranged in the path of the light rays emitted by said light source; receiving means arranged in the path of light rays between said photoelectric cell and said light source for receiving a substance the light absorption properties of which are to be determined; A.C. voltage source means connected to said light source for energizing the same; rectifier circuit means comprising a voltage rectifier series-connected to a resistor and a capacitor connected in parallel with said resistor, said rectifier circuit means being connected across said A.C. voltage source means; first circuit means connected across said rectifier circuit means and capable of deriving therefrom an electric compensating voltage which is proportional to the A.C. voltage supplied to said light source for supplying said compensating voltage across said photoelectric cell in such a manner that the voltage generated by said photoelectric cell is of opposite polarity relative to said compensating voltage; electric indicating means for indicating the absorption of light in the substance received by said receiving means; and second circuit means electrically connecting in parallel said photoelectric cell and said indicating means.

3. An arrangement for testing of translucent substances, comprising, in combination, a light source; a photoelectric cell arranged in the path of the light rays emitted by said light source; receiving means arranged in the path of light rays between said photoelectric cell and said light source for receiving a substance the light absorption properties of which are to be determined; A.C. voltage source means; rectifier circuit means connected across said A.C. voltage source means; first circuit means for electrically connecting said light source across said rectifier circuit means, said first circuit means including a plurality of first resistors; second circuit means connected across said rectifier circuit means and capable of deriving therefrom an electric compensating voltage which is proportional to the A.C. voltage supplied to said light source for supplying said compensating voltage across said photoelectric cell, said second circuit means including a plurality of second resistors connected in series to said photoelectric cell in such a manner that the voltage generated by said photoelectric cell is of opposite polarity relative to said compensating voltage; electric indicating means for indicating the absorption of light in the substance received by said receiving means; third circuit means electrically connecting said indicating means across the series-circuit constituted by said photoelectric cell and said plurality of second resistors; and means for selectively short-circuiting a number of said plurality of first resistors as well as a number of said plurality of second resistors, whereby the measuring range of said indicating means may be altered.

4. The arrangement defined in claim 3, and actuating means for actuating said short-circuiting means.

5. The arrangement defined in claim 4 wherein said short-circuiting means include a plurality of switch means associated, respectively, with said plurality of first and second resistors for short-circuiting the respective resistors upon actuation of the respective switch means, and wherein said actuating means are in the form of a template having actuating portions adapted to actuate said plurality of switch means, thereby operating said short-circuiting means.

6. The arrangement defined in claim 5 wherein said template is formed with an additional portion adapted to cooperate with means for placing color filters in the path of light rays between said source of light and said receiving means.

7. The arrangement defined in claim 5 wherein said indicating means include a dial component, and wherein said template is associated with said dial component and has actuating portions that actuate those of said plurality of switch means as will produce that measuring range of said indicating means which corresponds to said dial component.

References Cited in the file of this patent

UNITED STATES PATENTS

| | | |
|---|---|---|
| 2,048,554 | Kuder | July 21, 1936 |
| 2,065,114 | Cahn et al. | Dec. 22, 1936 |
| 2,171,961 | Fortune | Sept. 5, 1939 |
| 2,186,902 | Fortune | Jan. 9, 1940 |
| 2,241,743 | Schoene | May 13, 1941 |
| 2,245,124 | Bonn | June 10, 1941 |
| 2,282,741 | Parker | May 12, 1942 |
| 2,466,558 | Sadlon | Apr. 5, 1949 |
| 2,467,057 | Simmon | Apr. 12, 1949 |
| 2,472,381 | McMaster | June 7, 1949 |
| 2,548,755 | Vossberg et al. | Apr. 10, 1951 |
| 2,626,361 | Martine | Jan. 20, 1953 |